United States Patent
Zumdome et al.

(10) Patent No.: US 6,692,558 B2
(45) Date of Patent: Feb. 17, 2004

(54) FLUORESCENT MARKING STAIN AND PEN

(75) Inventors: William Zumdome, Bettendorf, IA (US); Tamie R. Simmons, Welton, IA (US); Shawn Kilty, Davenport, IA (US)

(73) Assignee: Illinois Tool Works, Inc., Glenview, IL (US)

( * ) Notice: Subject to any disclaimer, the term of this patent is extended or adjusted under 35 U.S.C. 154(b) by 107 days.

(21) Appl. No.: 09/957,771

(22) Filed: Sep. 21, 2001

(65) Prior Publication Data

US 2003/0056689 A1 Mar. 27, 2003

(51) Int. Cl.[7] .......................... C09D 11/00; C09K 11/02
(52) U.S. Cl. .............................. 106/31.15; 106/31.37; 106/31.58; 106/31.32; 252/301.35
(58) Field of Search ................ 106/31.15, 31.32, 106/31.58, 31.37; 401/17; 252/301.35

(56) References Cited

U.S. PATENT DOCUMENTS

| | | | | |
|---|---|---|---|---|
| 4,186,020 A | * | 1/1980 | Wachtel | 523/161 |
| 4,243,694 A | * | 1/1981 | Mansukhani | 427/466 |
| 4,271,253 A | * | 6/1981 | Hara et al. | 430/216 |
| 4,301,223 A | * | 11/1981 | Nakamura et al. | 430/17 |
| 4,601,863 A | * | 7/1986 | Shioi et al. | 264/4.3 |
| 4,936,916 A | * | 6/1990 | Shinmitsu et al. | 523/210 |
| 5,203,638 A | * | 4/1993 | Redmond, Jr. | 401/17 |
| 5,614,289 A | * | 3/1997 | Kobayashi et al. | 428/195 |
| 5,880,176 A | * | 3/1999 | Kamoto et al. | 523/172 |
| 5,897,938 A | * | 4/1999 | Shinmoto et al. | 428/354 |
| 6,517,619 B1 | * | 2/2003 | Nowak et al. | 106/31.32 |

* cited by examiner

Primary Examiner—C. Melissa Koslow
Assistant Examiner—Veronica F. Faison
(74) Attorney, Agent, or Firm—Mark W. Croll, Esq.; Donald J. Breh, Esq.; Welsh & Katz, Ltd.

(57) ABSTRACT

A fluorescent marking stain for marking items is formulated from a resin present in a concentration of about 1 percent to about 5 percent of the stain, an active solvent for and compatible with the resin present in a concentration of about 40 percent to about 50 percent of the stain, a dye solvent present in a concentration of about 20 percent to about 30 percent of the stain, a diluent present in a concentration of about 10 percent to about 20 percent of the stain, an adhesion promoter present in a concentration of about 1 percent to about 5 percent of the stain, an optical brightener present in a concentration of about 1 percent to about 5 percent of the stain and a fluorescent dye present in a concentration of about 0.2 percent to about 5 percent of the stain. A marking pen for use with the marking stain is also disclosed.

18 Claims, 1 Drawing Sheet

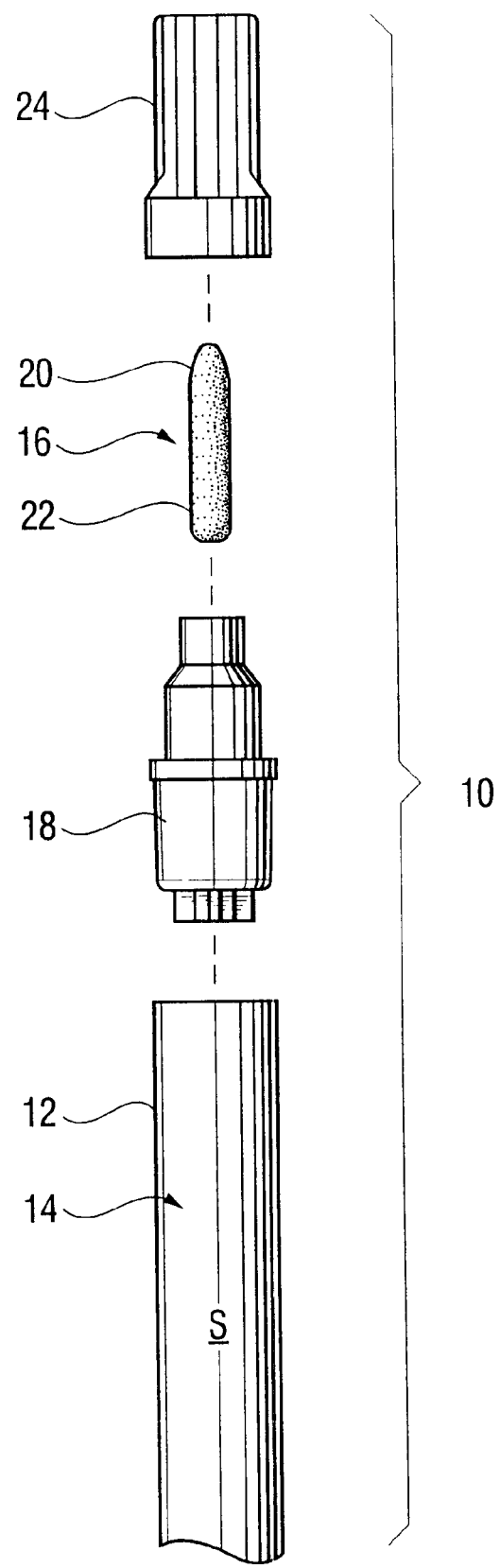

FLUORESCENT MARKING STAIN AND PEN

BACKGROUND OF THE INVENTION

The present invention is directed to a fluorescent marking stain. More particularly, the present invention is directed to a readily applyable fluorescent marking stain and pen for use in coating or marking parts.

Many types of parts are more easily identified and/or located when marked. To this end, parts are often marked with paints or dyes for use in assemblies. However, known paints or dyes for this use are simply colored. Thus, while this marking facilitates identification, it does not enhance the ability to identify or locate the parts, generally.

To this end, it has been found useful to provide the ability to locate or identify parts using enhanced visual means.

Accordingly, there exists a need for a fluorescent marking stain that enhances the ability to visually identify and locate parts. Desirably, such a stain is provided in a readily usable device to permit marking of parts.

BRIEF SUMMARY OF THE INVENTION

A fluorescent marking stain is used for marking items. The stain enhances the ability to visually identify and locate parts. Preferably, such a stain is provided in a readily usable device to permit marking of parts. A present marking stain is yellow.

The marking stain is formulated from a resin present in a concentration of about 1 percent to about 5 percent of the stain, an active solvent for and compatible with the resin present in a concentration of about 40 percent to about 50 percent of the stain, a dye solvent present in a concentration of about 20 percent to about 30 percent of the stain, a diluent present in a concentration of about 10 percent to about 20 percent of the stain, an adhesion promoter present in a concentration of about 1 percent to about 5 percent of the stain, an optical brightener present in a concentration of about 1 percent to about 5 percent of the stain and a fluorescent dye present in a concentration of about 0.2 percent to about 5 percent of the stain.

In a preferred formulation, the resin is nitrocellulose present in a concentration of about 3.3 percent of the stain and the active solvent is butyl acetate present in a concentration of about 43 percent of the stain.

A preferred dye solvent includes ethanol, propyl acetate and isopropanol, and is present in a concentration of about 27 percent of the stain. The dye solvent can be formulated such that the ethanol is present in a concentration of about 90 percent to about 98 percent of the dye solvent, the propyl acetate is present in a concentration of about 1 percent to about 5 percent of the dye solvent and the isopropanol is present in a concentration of about 1 percent to about 5 percent of the dye solvent.

A preferred diluent is butanol present in a concentration of about 18 percent of the stain. The adhesion promoter is preferably a polyamide resin, and is present in a concentration of about 4.5 percent of the stain. A preferred fluorescent dye is a quinoline dye present in a concentration of about 0.3 percent of the stain and a preferred optical brightener is an amino coumarin in a concentration of optical brightener is about 1.2 percent of the stain.

The fluorescent marking stain can further include one or more plasticizers. The plasticizers can be present in a concentration of about 1 percent to about 5 percent of the stain. The plasticizers can include tri-phenyl phosphate and castor oil, present in a concentration of about 1.4 percent and 0.6 percent, respectively.

A marking pen for marking with the marking stain includes a porous nib and a chamber for storing the stain, in which the nip is in fluid communication with the stain in the chamber.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is an exploded view of an exemplary pen for use with the fluorescent marking stain embodying the principles of the present invention.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

A fluorescent marking stain in accordance with the present invention has been found to be useful for marking items. A preferred stain is of the type that will adhere to parts, including metal parts an the like. Although many types of stains or dyes are known, a stain for use in marking parts must be able to adhere to such parts without being readily removed or "rubbed off" of the parts. Additionally, such a stain or dye must be formulated so as to not flake off of the parts so marked.

A present fluorescent marking stain is formulated from resin carried in a compatible active solvent. Preferably, the resin is nitrocellulose and the compatible solvent is butyl acetate. Other resins as well as solvents compatible with nitrocellulose and such other resins will be recognized by those skilled in the art.

In a present formulation, the nitrocellulose is present in a concentration of about 1 percent to about 5 percent, and preferably about 3.3 percent of the stain and the active solvent is present in a concentration of about 40 percent to about 50 percent, and preferably about 43 percent of the stain.

In the present marking stain, the nitrocellulose is provided in a solution of butyl acetate and isopropanol, such as that commercially available from Akzo Nobel Coatings of Somerset, N.J., as product No. 50-C3-801. Additional butyl acetate, if needed, can be, for example, that commercially available from Union Carbide Corporation, under the product name Butyl Acetate Urethane Grade.

The stain further includes a dye solvent, also compatible with the resin, A preferred dye solvent includes ethanol, propyl acetate and isopropanol. In a preferred dye solvent, the ethanol is present in a concentration of about 90% to about 98% of the dye solvent, the propyl acetate is present in a concentration of about 1% to about 5% of the dye solvent and the isopropanol is present in a concentration of about 1% to about 5% of the dye solvent. In a present formulation, the dye solvent is present in a concentration of about 27 percent of the stain.

The dye solvent used in the present marking stain is commercially available under the product name Duplicating Fluid 5, from HCI Chemtech Distribution, Incorporated of Chesterfield, Mo.

It is anticipated that other solvents can be used in formulation of the stain. For example, light alcohols, such as isopropanol, ethanol and the like can be used for the solvent. Those skilled in the art will recognize the various solvents that will be compatible with the resin, which other solvents are within the scope and spirit of the present invention.

The marking stain further includes a diluent. A preferred diluent is butanol present in a concentration of about 10 percent of the stain to about 20 percent of the stain. In a present stain, the butanol is present in a concentration of about 18 percent of the stain. One commercially available butanol is that available from BASF Corporation of Mount Olive, N.J., under the product identification code NCO 526220.

To provide adhesion of the marking stain, and more particularly the dye to the parts, the stain includes an adhesion promoter. In a present formulation, the adhesion promoter is polyamide resin, present in a concentration of about 1 percent to about 5 percent of the stain, and preferably about 4.5 percent of the stain. One polyamide resin is a dimer acid based polyamide resin, commercially available under the trade name Versamid 757 from Cognis Corporation of Cincinnati, Ohio.

Other resins will be recognized by those skilled in the art. Such other resins must be compatible with both the resin as well as the active solvent. It is also anticipated that other functional adhesion promoters can be used. For example, it is anticipated that alkyds and the like will function as an adhesion promoter for the stain. All such other functional adhesion promoters are within the scope and spirit of the present invention.

The marking stain further includes a fluorescent dye present in a concentration of about 0.2 percent to about 5 percent of the stain, and preferably about 1.4 percent of the stain. A present dye is a quinoline dye, such as that available from Sunbelt Corporation of Rock Hill, S.C. under the trade name Morplas Fluorescent Yellow G Powder (Solvent Yellow 43).

To enhance the florescence, the stain includes an optical brightener present in a concentration of about 1 percent to about 5 percent of the stain, and preferably about 0.6 percent of the stain. A preferred optical brightener is an amino coumarin, and preferably 4-methyl, 7-diethyl amino coumarin, commercially available under the trade name Keywhite RWP, from Keystone Aniline Corporation of Chicago, Ill. Other optical brighteners will be recognized by those skilled in the art.

Optionally, to enhance the flow characteristics and "workability" of the marking stain, the stain can include one or more plasticizers. Plasticizers such as tri-phenyl phosphate, castor oil and the like can be present in a concentration of about 1 percent to about 10 percent of the stain. These can be obtained commercially from Solutia Inc. of St. Louis Mo. and Caschem, Inc. of Bayonne, N.J., the former under its chemical name and the latter under the trade name #15 Oil.

As will be recognized by those skilled in the art, the present marking stain, having an organic base (e.g., in an organic solvent solution), will adhere to parts and the like the have been coated or otherwise protected with, for example, a light oil. Many such parts are fabricated from carbon steel materials or materials that maybe susceptible to oxidation. As such, upon machining these parts are often coated with a light oil to protect these parts by prevent oxygen from contacting the part surfaces.

The present marking stain is formulated to penetrate the oil coating to permit the stain to contact the part surface. As such, the stain will adhere to the part, and will not "rub-off" when the part is contacted. Thus, it is anticipated that the parts can be marked with the stain, as after fabrication, and the stain will remain adhered to the part in shipping and handling.

The nitrocellulose in the stain is the principle coating agent for the stain. The solvent is present to dissolve the nitrocellulose and to permits the nitrocellulose to be carried in solution. The solvent, such as the exemplary butyl acetate is relatively volatile, and will thus evaporate after application of the stain. Although evaporation is desired, other solvents, having less volatile organic compound (VOC) characteristics are anticipated. One such alternate, anticipated solvent is acetone.

The solvent further assists in enhancing the flow characteristics of the stain. That is, the solvent is a viscosity modifier or viscosity controlling constituent for the stain. It will be understood by those skilled in the art that the concentration of the solvent must be sufficiently high to dissolve the resin (i.e., to bring the resin to solution), while not being so high that it will adversely affect the drying time of the stain.

In that the marking of the parts is a secondary operation, that is, it does not in and of itself effectuate part fabrication, it must be process that minimally, if at all, impacts the fabrication process and the time and cost to carry out the fabrication process. Thus, a desired marking stain dries quickly, dries well and adheres to the part. To this end, the concentration of the solvent, vis-a-vis the entirety of the stain, must be such that it permits ready application of the stain while providing for rapid drying and a "not-easily removed" mark.

In one use, the marking stain is applied using a "pen", exemplary of which is the pen 10 illustrated in FIG. 1. Such a pen 10 includes a body 12 defining a sealed chamber 14 in which the marking stain S is stored. A nib 16 is formed from a porous material, such as felt, and is mounted to the body 12 by a biased valve assembly 18. The nib 16 has a marking end 20 and a supply end 22, from which the stain S is supplied to the marking end 20. A typical pen 10 includes a cap 24 to prevent the pen 10 from drying out. Such a marking pen is commercially available from ITW Mark-Tex of Roseland, N.J.

The nib 16 is biased to an outward position in which it extends outwardly of the body 12 and valve assembly 18. The supply end 22 of the nib is positioned in the valve assembly 18. When a (downward) pressure is applied to the nib 16, the nib 16 urges the valve assembly 18 open which permits the stain S to flow from the chamber 14, into the valve 18 and into contact with the nib supply end 22. This saturates the nib 16 with the stain S which flows through the nib 16 to the marking end 20. Contact of the marking end 20 with an item, thus results in marking the item. Marking pens such as these are well known in the art.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fluorescent marking stain for marking items comprising:
   a resin present in a concentration of about 1 percent to about 5 percent of the marking stain;
   an active solvent for and compatible with the resin present in a concentration of about 40 percent to about 50 percent of the marking stain;
   a dye solvent present in a concentration of about 20 percent to about 30 percent of the marking stain;
   a diluent present in a concentration of about 10 percent to about 20 percent of the marking stain;
   an adhesion promoter present in a concentration of about 1 percent to about 5 percent of the marking stain;
   an amino coumarin optical brightener present in a concentration of about 1 percent to about 5 percent of the marking stain; and
   a fluorescent dye present in a concentration of about 0.2 percent to about 5 percent of the marking stain.

2. The fluorescent marking stain in accordance with claim 1 wherein the resin is nitrocellulose.

3. The fluorescent marking stain in accordance with claim 1 wherein the active solvent is butyl acetate.

4. The fluorescent marking stain in accordance with claim 1 wherein the dye solvent includes ethanol, propyl acetate and isopropanol.

5. The fluorescent marking stain in accordance with claim 4 wherein the dye solvent includes ethanol, propyl acetate and isopropanol, and wherein the ethanol is present in a concentration of about 90 percent to about 98 percent of the dye solvent, the propyl acetate is present in a concentration of about 1 percent to about 5 percent of the dye solvent and the isopropanol is present in a concentration of about 1 percent to about 5 percent of the dye solvent.

6. The fluorescent marking stain in accordance with claim 1 wherein the diluent is butanol.

7. The fluorescent marking stain in accordance with claim 1 wherein the adhesion promoter is a polyamide resin.

8. The fluorescent marking stain in accordance with claim 1 wherein the fluorescent dye is a quinoline dye.

9. The fluorescent marking stain in accordance with claim 1 including a plasticizer.

10. The fluorescent marking stain in accordance with claim 9 wherein the plasticizer is at least one of tri-phenyl phosphate and castor oil.

11. The fluorescent marking stain in accordance with claim 10 wherein the plasticizer is present in a concentration of about 1 percent to about 5 percent of the marking stain.

12. The fluorescent marking stain in accordance with claim 1 wherein the marking stain is yellow.

13. A fluorescent marking stain for marking items comprising;
    nitrocellulose present in a concentration of about 1 percent to about 5 percent of the marking stain;
    butyl acetate as an active solvent for mid compatible with the nitrocellulose present in a concentration of about 40 percent to about 50 percent of the marking stain;
    a dye solvent present in a concentration of about 20 percent to about 30 percent of the marking stain comprising ethanol, propyl acetate and isopropanol;
    a diluent present comprising butanol present in a concentration of about 10 percent to about 20 percent of the marking stain;
    an adhesion promoter comprising a polyamide resin present in a concentration of about 1 percent to about 5 percent of the marking stain;
    an amino coumarin optical brightener present in a concentration of about 1 percent to about 5 percent of the marking stain; and
    a fluorescent dye present in a concentration of about 0.2 percent to about 5 percent of the marking stain.

14. The fluorescent marking stain in accordance with claim 13 including a plasticizer.

15. The fluorescent marking stain in accordance with claim 13 wherein the marking stain is yellow.

16. A marking pen comprising:
    a porous nib;
    a chamber for storing a marking stain, the nip being in fluid communication with the marking stain; and
    a fluorescent marking stain comprising a resin present in a concentration of about 1 percent to about 5 percent of the marking stain, an active solvent for and compatible with the resin present in a concentration of about 40 percent to about 50 percent of the marking stain, a dye solvent present in a concentration of about 20 percent to about 30 percent of the marking stain, a diluent present in a concentration of about 10 percent to about 20 percent of the marking stain, an adhesion promoter present in a concentration of about 1 percent to about 5 percent of the marking stain, an amino coumarin optical brightener present in a concentration of about 1 percent to about 5 percent of the marking stain and a fluorescent dye present in a concentration of about 0.2 percent to about 5 percent of the marking stain.

17. The marking pen in accordance with claim 16 wherein the nib is biasedly mounted for reciprocating movement into and out of the chamber.

18. The marking pen in accordance with claim 16 wherein the fluorescent marking stain is yellow.

* * * * *

UNITED STATES PATENT AND TRADEMARK OFFICE
CERTIFICATE OF CORRECTION

PATENT NO. : 6,692,558 B2
DATED : February 17, 2004
INVENTOR(S) : Zumdome et al.

It is certified that error appears in the above-identified patent and that said Letters Patent is hereby corrected as shown below:

Column 6,
Line 10, should read -- butyl acetate as an active solvent for and compatible with --
Line 33, should read -- a chamber for storing a marking stain, the nib being in --

Signed and Sealed this

Fourth Day of May, 2004

JON W. DUDAS
*Acting Director of the United States Patent and Trademark Office*